Jan. 27, 1959    R. W. B. RICHARDS    2,870,802
UNDER-TABLE, TRAVELING-SAW APPARATUS
FOR CUTTING SHEETS OF MATERIALS
Filed Sept. 17, 1957    3 Sheets-Sheet 1
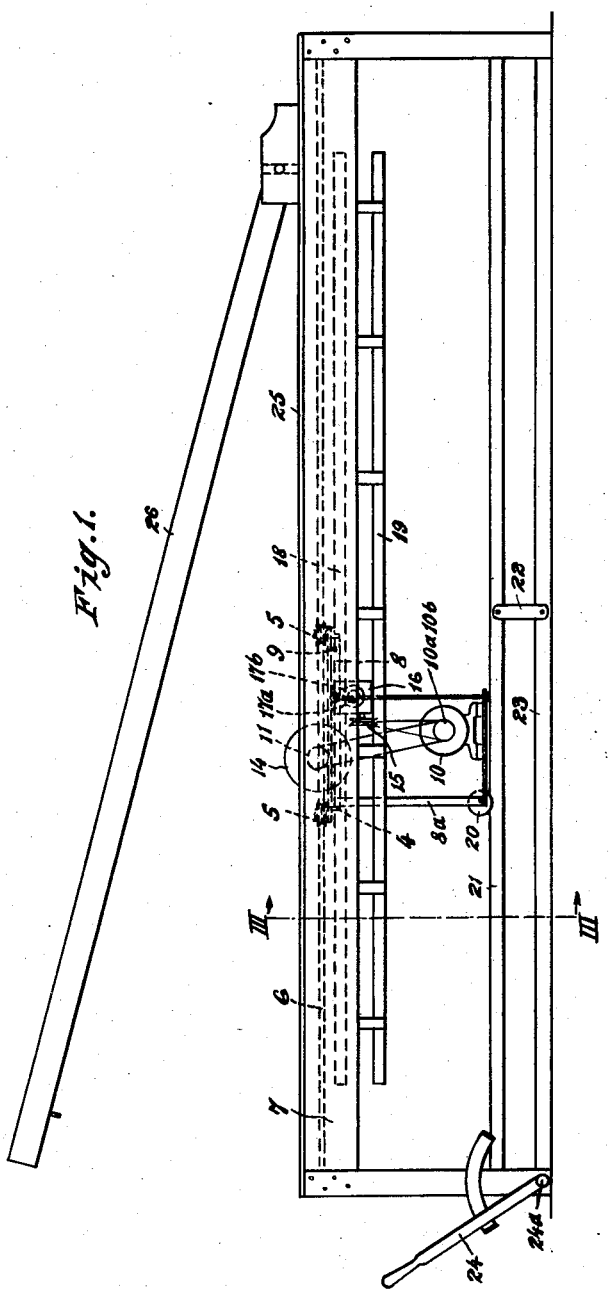
Inventor.
ROBERT W. B. RICHARDS
By
Victor D. Borst Attorney

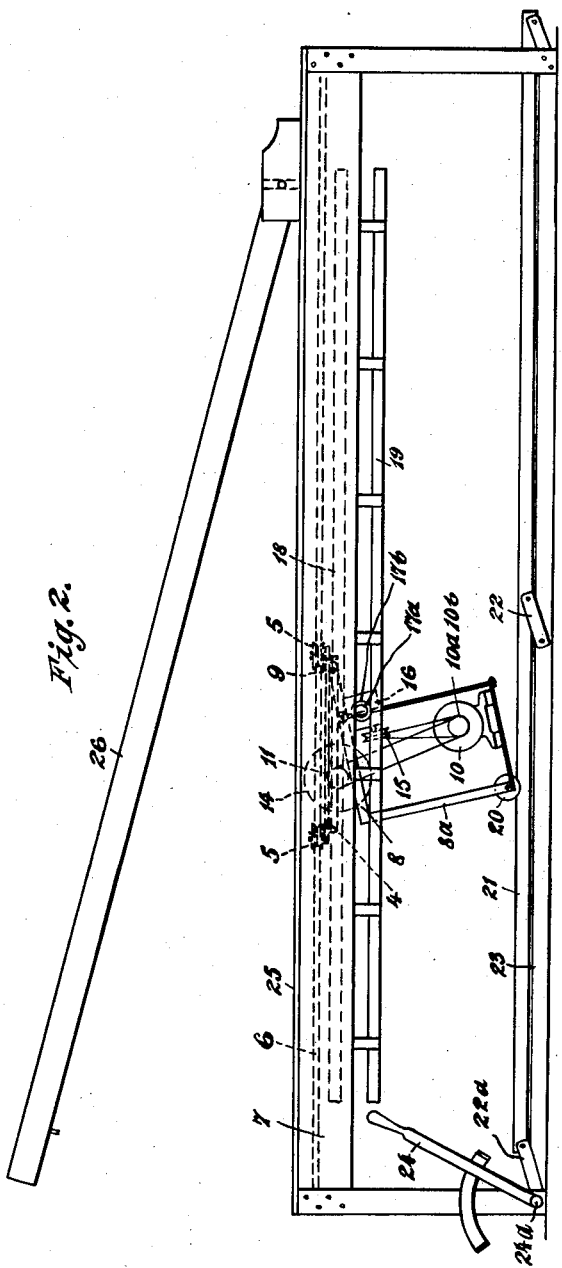

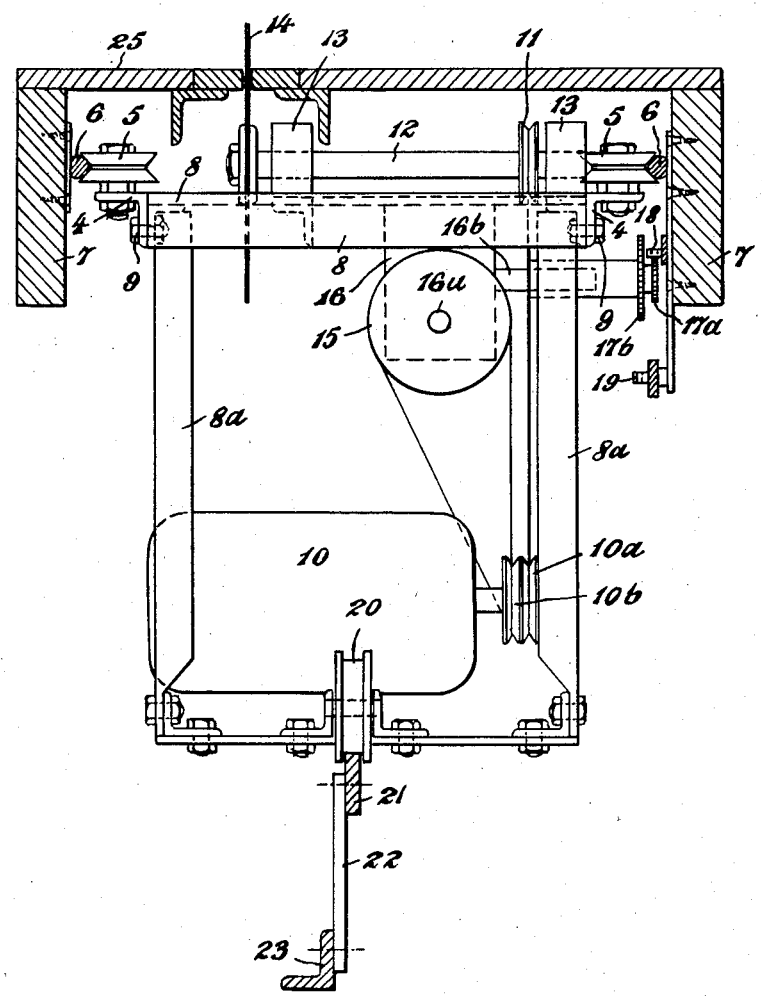

United States Patent Office 2,870,802
Patented Jan. 27, 1959

2,870,802

UNDER-TABLE, TRAVELING-SAW APPARATUS FOR CUTTING SHEETS OF MATERIALS

Robert William Birch Richards, Shrewsbury, Salop, England, assignor to Thomas Robinson & Son Limited, Rochdale, England Application September 17, 1957, Serial No. 684,489

3 Claims. (Cl. 143—47)

This invention relates to apparatus for cutting sheets of material of the type which comprises a tranversable carriage disposed beneath a saw table and carrying a circular saw blade driven by an electric motor mounted on the carriage, the saw blade projecting upwards through and adapted to be traversed to and fro along a slot in the saw table.

The present invention has for its primary object to increase the speed of operation of the apparatus. The invention further eliminates the necessity for providing two electric motors, i. e. one for rotating the saw blade and one for traversing the carriage.

According to the present invention apparatus for cutting sheets of material as aforesaid is characterised in that means is provided whereby the saw blade can be disposed wholly beneath the surface of the saw table during the return traverse of the saw carriage to admit of the manipulation of a sheet of material on the saw table during the said return traverse.

Means for carrying the present invention into practice will now be described with reference to the accompanying drawings wherein:

Fig. 1 is a side elevation of apparatus according to the invention wherein the saw blade is raised during its forward and cutting traverse;

Fig. 2 is a side elevation of the apparatus seen in Fig. 1 but wherein the saw blade is lowered during its return traverse; and Fig. 3 is a section on the line III—III seen in Fig. 1.

The apparatus for cutting sheets of material illustrated in the drawings includes a saw carriage which is of two-part construction and comprises a rectangular first or outer frame 4 of angle iron strip which is mounted for traverse in a horizontal plane beneath a saw bench by engagement of rollers 5 rotatably mounted at the corners of the frame 4 with a pair of horizontal guide rails 6 which are fastened to the inside faces of the longitudinal sides 7 of the saw bench.

Within the frame 4 is located a second or inner rectangular frame 8 of angle section strip which is pivotally associated with the first or outer frame 4 by a pair of pivot bolts 9. The inner frame 8 carries a dependent structure 8a for the support of an electric motor 10. The motor 10 is provided with a pair of driving pulley wheels 10a and 10b, and one pulley wheel 10a has driving connection with a pulley wheel 11 secured to a transverse shaft 12 which is rotatably mounted in brackets 13 on the inner frame 8 of the saw carriage and carries at one end a saw blade 14. The second pulley wheel 10b on the motor 10 has driving connection with a pulley wheel 15 secured to an input shaft 16a of a worm reduction gear unit 16 mounted on the inner frame 8 of the saw carriage. An output shaft 16b of the reduction gear unit carries a pair of pinions 17a and 17b and the outer pinion 17a, which is of smaller diameter than the second pinion 17b, is adapted for engagement, in the raised position of saw blade 14, with a longitudinally extending rack bar 18 secured to one of the sides 7 of the saw bench beneath and parallel with the guide rail 6 thereon.

In the lowered position on the saw blade 14 the second and larger pinion 17b is adapted for engagement with a second rack bar 19 which is secured on the side 7 of the saw bench beneath and parallel to the upper rack bar 18.

The forward lower part of the dependent structure 8a of the saw carriage carries a guide wheel 20 which is supported by a longitudinally extending rail 21 which is connected by pivotal links 22 to a longitudinally extending angle section strip 23 incorporated in the base of the saw bench so that the rail 21 forms the upper member of a parallel motion linkage. A link 22a at the forward end of the saw bench is secured to a transverse shaft 24a which is adapted to be rotated by a manually operated control lever 24 whereby the rail 21 can be raised as seen in Figs. 1 and 3 or lowered as seen in Fig. 2.

In operation, a sheet of material to be cut is placed on the surface 25 of the saw table and is held in this position by means of a guard 26. The rail 21 is raised by the operator into its uppermost position by means of the control lever 24 thereby raising the pivoted frame 8 of the saw carriage so that the smaller pinion 17a engages with the upper rack bar 18, and the saw blade 14 is projected partly above the surface 25 of the saw table. The electric motor 10 is then energised whereupon the saw blade is rotated and the saw carriage is traversed along the guide rails 6 in the forward direction by the engagement of the driving pinion 17a with the upper rack bar 18. When the saw blade 14 has completed its cutting stroke the operator displaces the control lever 24 to lower the rail 21 and consequently to lower the saw blade on the inner frame 8 of the saw carriage, as seen in Fig. 2, whereby the larger pinion 17b is caused to engage the lower rack bar 19 to effect reversal of the traverse of the saw carriage, the return traverse being effected at a greater speed than the forward or cutting traverse by virtue of the larger diameter of the pinion 17b.

It will be appreciated that, during the return traverse of the saw carriage, since the saw blade 14 has been lowered beneath the surface 25 of the saw table, the operator is free to remove or reposition the sheet of material on the saw table without having to await completion of the return traverse of the saw blade.

In order to avoid damage to the apparatus should the control lever 24 be accidently released by the operator an oil valve (not shown) may be incorporated in the saw carriage for "cushioning" the displacement thereof.

I claim:

1. Apparatus for cutting sheets of material comprising a saw table having a longitudinal slot therein, longitudinal guide rails below said saw table, a carriage disposed beneath said saw table and arranged to be traversed to and from longitudinally of said table, said carriage comprising an outer frame mounted on said longitudinal guide rails and an inner frame pivotally associated with said outer frame, a circular saw blade and an electric driving motor therefor mounted upon said inner frame, pinion means mounted on said inner frame and having driving connection with said driving motor, a pair of parallel rack bars disposed longitudinally below said saw table, and a support rail for said inner frame, said support rail being vertically displaceable to raise said inner frame to cause said saw blade to project through said slot and to cause said pinion means to engage one of said racks for forward traverse of said carriage, and to lower said inner frame to lower said saw blade so that it does not project through said slot and to cause said pinion means to engage the other of said racks for return traverse of the carriage, thereby permitting manipulation of a sheet of material on said work table during said return traverse.

2. Apparatus as set forth in claim 1 wherein said pinion means comprises pinions of different diameters, the smaller of which engages its said rack for said forward traverse of said carriage for slow feed and the larger of which engages its said other rack for said return traverse for comparatively fast return.

3. Apparatus for cutting material in rigid sheet form comprising a saw table having a longitudinal slot therethrough, a pair of spaced, longitudinal guide rails disposed below said saw table, a carriage disposed beneath said saw table between said horizontally spaced longitudinal guide rails, said carriage being arranged to be traversed to and fro longitudinally of said table on said rails, said carriage comprising an outer frame, rollers provided at opposite sides of said frame and arranged to run on said spaced, longitudinal guide rails, an inner frame having traversing gear mechanism adapted to engage said saw table, said outer frame being pivotally connected to the front side of said inner frame, a circular saw blade and an electric motor therefor mounted upon said inner frame, a roller mounted at the bottom of and on the rear side of said inner frame, a rail whereon said roller runs, means at one end of said apparatus for raising and lowering said rail to cause said inner frame to pivot on said outer frame, thereby raising and lowering said saw blade above and below said table, a motor on said inner frame, and connections from said motor to said saw and to said traversing gear on said inner frame.

References Cited in the file of this patent

UNITED STATES PATENTS

| | | |
|---|---|---|
| 1,756,287 | Freshwater et al. | Apr. 29, 1930 |
| 1,762,023 | Longenecker | June 3, 1930 |
| 1,813,435 | Bentz | July 7, 1931 |
| 2,536,437 | Grant | Jan. 2, 1951 |
| 2,601,878 | Anderson | July 1, 1952 |

FOREIGN PATENTS

| | | |
|---|---|---|
| 271,449 | Switzerland | Jan. 16, 1951 |
| 727,204 | Great Britain | Mar. 30, 1955 |